United States Patent
Birner et al.

(10) Patent No.: US 7,614,299 B2
(45) Date of Patent: Nov. 10, 2009

(54) DEVICE AND METHOD FOR MONITORING A GAS VOLUME IN A UNIT FILLED WITH LIQUID

(75) Inventors: Friedrich Birner, Trautskirchen (DE); Rüdiger Kutzner, Zirndorf (DE)

(73) Assignee: Siemens Aktiengesellschaft, Munich (DE)

( * ) Notice: Subject to any disclaimer, the term of this patent is extended or adjusted under 35 U.S.C. 154(b) by 440 days.

(21) Appl. No.: 10/583,337

(22) PCT Filed: Nov. 30, 2004

(86) PCT No.: PCT/DE2004/002656

§ 371 (c)(1),
(2), (4) Date: Jun. 19, 2006

(87) PCT Pub. No.: WO2005/059483

PCT Pub. Date: Jun. 30, 2005

(65) Prior Publication Data

US 2007/0119230 A1    May 31, 2007

(30) Foreign Application Priority Data

Dec. 19, 2003 (DE) ................................. 103 61 884

(51) Int. Cl.
*G01F 23/32* (2006.01)
(52) U.S. Cl. ........................................ 73/317; 73/290 B
(58) Field of Classification Search ................ 73/290 B, 73/307, 310, 311, 317, 318, 454
See application file for complete search history.

(56) References Cited

U.S. PATENT DOCUMENTS

| | | | | |
|---|---|---|---|---|
| 53,344 A | * | 3/1866 | Robinson | 73/306 |
| 1,141,500 A | * | 6/1915 | Stahle | 73/317 |
| 1,620,823 A | * | 3/1927 | Mabie | 73/306 |
| 1,634,165 A | * | 6/1927 | Williams | 73/317 |
| 1,850,746 A | * | 3/1932 | Etnyre | 73/317 |
| 2,551,792 A | * | 5/1951 | De Giers et al. | 73/317 |
| 2,808,724 A | * | 10/1957 | Bloch et al. | 73/317 |

(Continued)

FOREIGN PATENT DOCUMENTS

CN    87102867 A    11/1988

(Continued)

OTHER PUBLICATIONS

Japanese Office Action dated Mar. 12, 2009.

*Primary Examiner*—John Fitzgerald
(74) *Attorney, Agent, or Firm*—Laurence A. Greenberg; Werner H. Stemer; Ralph E. Locher

(57) ABSTRACT

A device for monitoring a gas volume in a unit filled with a liquid, where the unit has an inlet line with at least one expansion chamber, and the device includes one or more buoyant bodies floating in the liquid. The floating buoyant body is connected to a shaft, fixed in the expansion chamber and mounted pivotally relative to the shaft. The gas volume above the liquid may be recorded rapidly and with high accuracy, by measuring the torque generated by the buoyant body, or an angle to the horizontal. There is also disclosed a method for monitoring a gas volume in a unit filled with liquid, by way of a floating buoyant body.

7 Claims, 1 Drawing Sheet

U.S. PATENT DOCUMENTS

| | | | |
|---|---|---|---|
| 2,882,729 A * | 4/1959 | Welser | 73/317 |
| 3,168,904 A * | 2/1965 | Conover | 137/558 |
| 3,200,644 A * | 8/1965 | Brous | 73/308 |
| 3,529,472 A * | 9/1970 | Riddel | 73/295 |
| 4,001,644 A * | 1/1977 | Lingenfelter et al. | 361/37 |
| 4,229,973 A * | 10/1980 | Hara | 73/317 |
| 4,790,184 A * | 12/1988 | Nakanishi | 73/317 |
| 6,199,428 B1 * | 3/2001 | Estevez-Garcia et al. | 73/305 |
| 2003/0094044 A1 | 5/2003 | Kruger et al. | |

FOREIGN PATENT DOCUMENTS

| | | |
|---|---|---|
| CN | 1138133 | 12/1996 |
| CN | 2368017 Y | 3/2000 |
| DE | 1 400 448 | 2/1937 |
| DE | 664 701 | 9/1938 |
| DE | 847 934 | 8/1952 |
| DE | 1 204 323 | 11/1965 |
| DE | 1 270 169 | 6/1968 |
| DE | 101 33 615 C1 | 4/2003 |
| EP | 0 883 222 A1 | 12/1998 |
| GB | 482634 | 4/1938 |
| JP | 48002098 Y1 | 1/1973 |
| JP | 54058159 U | 4/1979 |
| JP | 57046123 A | 3/1982 |
| JP | 09086335 A | 3/1997 |
| JP | 11048907 A | 2/1999 |
| JP | 2000046626 A | 2/2000 |

\* cited by examiner

DEVICE AND METHOD FOR MONITORING A GAS VOLUME IN A UNIT FILLED WITH LIQUID

BACKGROUND OF THE INVENTION

Field of the Invention:

The invention relates to a device for monitoring a gas volume in a unit filled with a liquid, the unit being connected via an inflow line to at least one expansion vessel and the device including a buoyant body floating in the liquid. For the purposes of the invention, the expansion vessel represents a vessel which can receive the liquid expanding via the inflow line of the unit, and represents a gas collecting container, such as for example a Buchholz relay, which is arranged upstream of a liquid expansion vessel. Furthermore, the invention relates to a method for monitoring a gas volume in a unit filled with liquid by means of a floating buoyant body in an expansion vessel of the unit.

In large transformers, adequate cooling of the units is absolutely necessary on account of the great magnetic and electrical losses that occur during operation and the associated heating of the transformers. For this purpose, the cores and windings of these transformers are mounted in a liquid container, in particular an oil tank. The cooling liquid located in the tank—usually a transformer oil—expands during operation on account of the heating of the transformer, the excess cooling liquid being collected in an expansion vessel provided above the transformer. In addition to the heat-induced expansion of the liquid, gases may be additionally released from the cooling liquid or produced within the unit or the connecting lines on account of the strong heating of the cooling liquid or on account of chemical-physical processes occurring in the transformer. Likewise, a leak within the unit or the connecting lines may cause the ambient air to penetrate into this gastight circuit and accumulate within the unit or in the expansion vessels. Owing to their density, these gases collect in the expansion vessels located above the transformer.

In their function as gas collecting containers, these expansion vessels are usually also referred to as Buchholz relays. The German industry standard DIN 42566 stipulates that, when operating an oil-cooled transformer, a warning message must be issued if a predetermined gas volume within the unit is exceeded. Reaching the predetermined gas volume is in this case detected within the Buchholz relay as a corresponding expansion vessel and gas collecting container, which is arranged upstream of an actual liquid expansion vessel. The liquid expansion vessel serves exclusively for receiving the expanding liquid and is therefore an open system, in contact with the ambient air. If there is a liquid in the liquid expansion vessel and no additional gases are formed within the unit, the expansion vessel (Buchholz relay) is completely filled with liquid. On the basis of the warning message detected in the expansion vessel, a possible critical state of the transformer is indicated and can be investigated by a thorough inspection of the transformer.

In addition, DE 101 33 615 C1 discloses a device for detecting undissolved gases in units filled with liquid, in particular high-voltage units, the variation over time of the production of gas in a Buchholz relay being determined by means of the device. The measuring device proposed in DE 101 33 615 comprises a differential pressure measuring device, which is connected via two liquid-filled lines to at least two pressure measuring connections. The liquid-filled lines are in this case connected on the one hand to the interior of the Buchholz relay and on the other hand to an upwardly open reference liquid column.

SUMMARY OF THE INVENTION

The object of the present invention is to detect quickly and reliably the gas volume present in a unit filled with liquid.

For this purpose, it is provided according to the invention that a floating buoyant body is connected to a shaft fixed in the expansion vessel and is mounted rotatably with respect to the shaft. For the purposes of the invention, the rotatable mounting of the shaft comprises the articulation of the buoyant body with respect to a rigid shaft, and also the rotation of the shaft about three axes of rotation of the shaft with a buoyant body fixedly connected to the shaft. The floating buoyant body reproduces the vertical level of the surface of the liquid within the expansion vessel, so that the additional knowledge of the shape and size of the expansion vessel can be used to conclude the gas volume located above the liquid.

A connecting element, in particular a rod of a small diameter and low own weight, expediently connects the shaft to the buoyant body kept at a distance from the latter. The relative height of the shaft with respect to the liquid surface and the length of the connection determine the measuring range of the gas volume to be detected and the accuracy of the gas detection.

A fixed-in-place force transducer advantageously detects the torque on the connection at a predetermined length (a). If a predetermined torque is exceeded by a torque measured in the force transducer, a processing device generates a warning message. With respect to the relative position of the shaft in the expansion vessel, the predetermined torque is a measure of the maximum gas volume to be detected within an expansion vessel used as a Buchholz relay for issuing a warning message and consequently conforms to the industry standard DIN 42566.

It is also advantageous that a number of buoyant bodies are arranged at fixed vertical levels, respectively offset from one another with respect to the shafts arranged parallel to one another, the respective buoyant bodies being of different sizes and/or densities. By providing buoyant bodies of different densities at different vertical levels of individual shafts, different gases can be detected and/or the accuracies of the gas volume measurement by means of the determined gas volumes of the different gas volume measurements can be calibrated. However, for the detection of different gases, it is necessary that the expansion vessel is subdivided into separate chambers and only one gas can be respectively determined in each chamber by a buoyant body located in the chamber.

Alternatively, a fixed-in-place angulometer detects the angle between the connection of the buoyant body and a transverse axis of the shaft. It is likewise possible by means of determining an angle to use the knowledge of the size and shape of the expansion vessel to determine a gas volume located above the liquid. If a predetermined angle of the connection of the floating body in relation to the horizontal is exceeded, a processing device in the expansion vessel used as a Buchholz relay generates a warning message and consequently likewise conforms to the industry standard DIN 42566.

The buoyant body advantageously includes additional capacitive and/or inductive and/or optical elements, a processing device detecting the electromagnetic and/or electrical and/or optical signals generated by them. The use of additional, alternative volume-determining methods makes it possible for the gas volumes that are respectively determined to be calibrated with one another.

According to the invention, a method for monitoring a gas volume in a unit filled with a liquid is provided, the unit having an inflow line with at least one expansion vessel and a buoyant body that floats in the liquid being located in the expansion vessel and the buoyant body being connected in the expansion vessel to a fixed shaft and mounted rotatably with respect to the shaft, the rotating movement of the floating body with respect to the shaft being determined. The shaft is advantageously fixed at a fixed vertical level within the expansion vessel on the basis of a maximum gas volume to be detected in relation to the inner side of the upper covering of the expansion vessel and the shaft is fixed at fixed vertical levels by means of a fixing device, in particular in the form of recesses provided along a mount.

Since the gas volume to be detected always accumulates above the liquid in the expansion vessel used as a Buchholz relay, the gas volume to be detected can expediently be fixed with respect to the inner side of the upper covering and consequently the vertical level of the shaft to be fixed can be determined.

Further advantageous measures are described in the remaining subclaims; the invention is described in more detail on the basis of exemplary embodiments and the following figures, in which:

DESCRIPTION OF THE INVENTION

Figure 1:
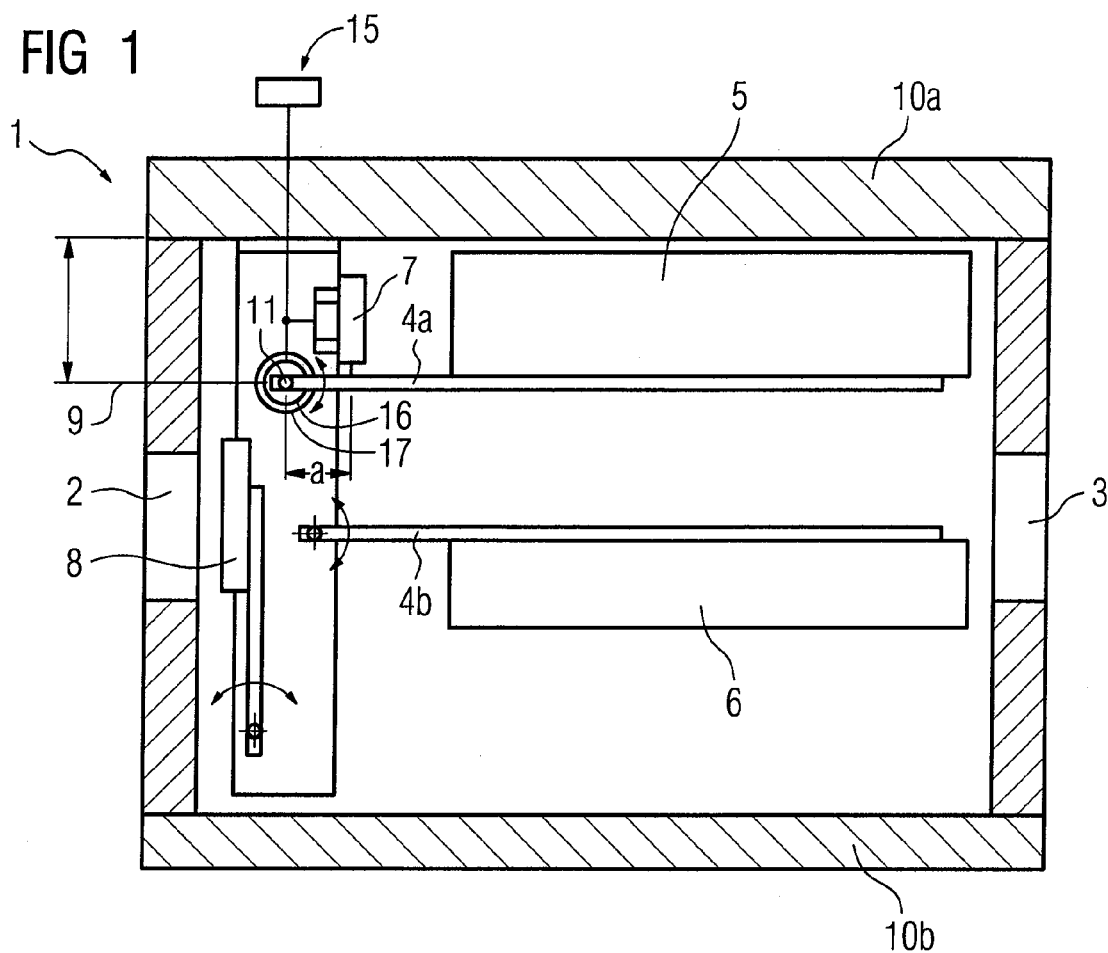
FIG. 1 shows a schematic representation of the device according to the invention.

FIG. 1 shows a schematic representation of the device according to the invention as an expansion vessel 1a. The expansion vessel 1a, arranged above a transformer (not represented), is connected via a connecting line (not represented) to an access opening 2. The expansion vessel 1a is also connected via an outlet opening 3 to a downstream expansion vessel 1b (not represented), it likewise being possible for the downstream liquid expansion vessel to be designed as an expansion vessel 1a with an outlet opening present in the upper covering (10a). The downstream expansion vessel 1b (not represented) thereby prevents an excessive rise in pressure within the expansion vessel 1a when it is completely filled with a liquid. Arranged within the expansion vessel 1a are two buoyant bodies 5, 6, the buoyant bodies 5, 6 being mounted rotatably in relation to the liquid surface of the liquid located in the expansion vessel 1a by means of spaced-apart connecting elements 4a, 4b. The upper buoyant body 5 is connected to a shaft 11 at a fixed vertical level 9 and rotatably mounted. The shaft 11 is advantageously fixed at a fixed vertical level within the expansion vessel 1a on the basis of a maximum gas volume to be detected in relation to the inner side of the upper covering 10a of the expansion vessel 1a and the shaft 11 is fixed at fixed vertical levels by means of a fixing device 17. The lower buoyant body 6 serves for switching off the entire transformer unit if the liquid level falls below a specific level, and consequently threatens overheating of the transformer. The same applies to the gate check 8, which in the case of a sudden rise in pressure—such as for example in the case of an explosion within the transformer—ensures immediate locking of the expansion vessel 1a. The upper buoyant body 5 is arranged within the expansion vessel 1a in such a way that, in the case of gas formation in the expansion vessel 1a, permanent detection of the gas volume is allowed. This is ensured by the upper buoyant body 5 being arranged at a predetermined distance from the inner side of the upper covering 10a of the expansion vessel 1a and mounted rotatably with respect to the relative level 9 that is fixed in this way. As a result, the formation of a gas volume within the expansion vessel 1a can be monitored permanently and continuously up until a maximum predetermined gas volume is reached, and a warning message can be issued by the system if the maximum predetermined gas volume is exceeded. The buoyant body 5 advantageously includes additional capacitive and/or inductive and/or optical elements 18, a processing device 15 detecting the electromagnetic and/or electrical and/or optical signals generated by them. The density and size of the buoyant bodies 5, 6 and the length of the connecting elements 4a, 4b are determined in dependence on the liquid used, and consequently on the basis of the maximum possible torque caused by the buoyancy of the floating body 5 in relation to the shaft 11. The force transducer 7, connected to the upper buoyant body 5 or the upper connecting element 4a, permanently reproduces the moment of force or torque generated by the buoyant body 5 and is consequently a measure of the gas volume located in the expansion vessel 1a, which as a result can be detected quickly and reliably. The fixed-in-place angulometer or stationary protractor 16 may be used to detect the angle between the connection of the buoyant body 5 and a transverse axis of the shaft for determining an angle to and thereby use the knowledge of the size and shape of the expansion vessel 1a to determine a gas volume located above the liquid.

Figure 2:
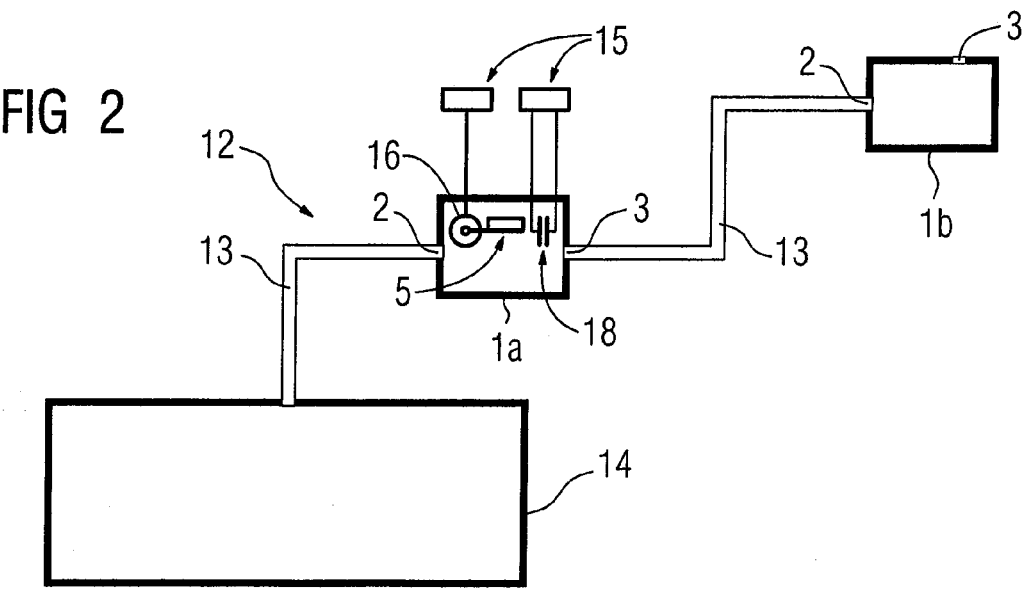
FIG. 2 shows a schematic representation of a gas detection system with two devices according to the invention.

FIG. 2 shows a schematic representation of a unit 12 with two expansion vessels 1a, 1b according to the invention. An inflow line 13 is arranged on a liquid container 14, in particular a high-voltage transformer unit, in the region of the cover of the liquid container 14. The inflow line is connected via the access opening 2 to a first expansion vessel 1a. The first expansion vessel 1a serves for detecting the gas volume of the unit 12 collecting in the expansion vessel 1a. Via an outlet opening 3, the first expansion vessel 1a is connected by means of a further inflow line 13 to a second expansion vessel 1b, arranged higher, via the access opening 2. Furthermore, the outlet opening 3 is located in the upper covering 10a (not represented) and serves for equalization with the ambient air. The gas volume measured in the second expansion vessel 1b is then measured at ambient pressure.

DESIGNATIONS 1a first expansion vessel
1b second expansion vessel
2 access opening
3 outlet opening
4a upper connecting element
4b lower connecting element
5 upper buoyant body
6 lower buoyant body
7 fixed-in-place force transducer
8 gate check
9 fixed vertical level
10a upper covering
10b lower covering
11 shaft
12 unit
13 inflow line
14 liquid container

The invention claimed is:

1. A device for monitoring a gas volume in a unit filled with a liquid, the unit having an inflow line with at least one expansion vessel, the device comprising:
- a stationary shaft mounted in the expansion vessel;
- at least one buoyant body floating in the liquid, said buoyant body being connected to said shaft and pivotally mounted with respect to said shaft;
- a connecting element connecting said buoyant body to said shaft at a spacing distance from said shaft; and
- a stationary force transducer disposed for detecting a torque on said connecting element at a predetermined distance from a pivot point defined by said shaft.

2. The device according to claim 1, which further comprises a processing device connected to receive a signal generated by said force transducer, and wherein, if a predetermined torque is exceeded as measured in said force transducer, said processing device generates a warning message.

3. The device according to claim 1, wherein said at least one buoyant body is one of a plurality of buoyant bodies disposed at defined vertical levels, said shaft is one of a plurality of mutually parallel shafts and said buoyant bodies are respectively offset from one another with respect to said shafts, and said buoyant bodies are formed of mutually different sizes and/or densities.

4. The device according to claim 1, which comprises additional elements selected from the group consisting of capacitive elements, inductive elements, and optical elements associated with said buoyant body and configured to generate respective electromagnetic, electrical, or optical signals, and a processing device connected to receive the signals generated by said elements.

5. A method for monitoring a gas volume in a unit filled with a liquid, the method which comprises:
- providing the unit with an inflow line and at least one expansion vessel;
- providing a buoyant body floating in or on the liquid in the expansion vessel, with the buoyant body being pivotally connected to a stationary shaft by connecting element connecting the buoyant body to the shaft at a spacing distance from the shaft, and
- detecting a pivoting movement of the floating body with respect to the shaft by using a stationary force transducer for detecting a torque on the connecting element at a predetermined distance from a picot point defined by the shaft.

6. The method according to claim 5, which comprises fixing the shaft at a defined vertical level within the expansion vessel as determined on a basis of a maximum gas volume to be detected relative to an inner surface of a top cover of the expansion vessel.

7. The method according to claim 5, which comprises mounting the shaft with a fixing device at predetermined vertical levels within the expansion vessel.

* * * * *